United States Patent

Wilks

[11] 4,138,821
[45] Feb. 13, 1979

[54] PELLET LENGTH AND END SQUARENESS INSPECTION APPARATUS

[75] Inventor: Robert S. Wilks, Plum Borough, Pa.
[73] Assignee: Westinghouse Electric Corp., Pittsburgh, Pa.
[21] Appl. No.: 643,717
[22] Filed: Dec. 23, 1975
[51] Int. Cl.² ............................................. G01B 7/00
[52] U.S. Cl. ............................. 33/174 Q; 33/DIG. 5
[58] Field of Search .......... 33/174 Q, DIG. 5, 143 L, 33/147 N, 147 L, DIG. 2

[56] References Cited

U.S. PATENT DOCUMENTS

| | | | |
|---|---|---|---|
| 2,772,484 | 12/1956 | Cargill et al. | 33/174 Q |
| 3,196,550 | 7/1965 | McMeekin | 33/174 Q |
| 3,750,294 | 8/1973 | Belke | 33/147 L |
| 3,750,298 | 8/1973 | Turner | 33/DIG. 2 |
| 3,927,476 | 12/1975 | Martin | 33/DIG. 2 |

*Primary Examiner*—Richard E. Aegerter
*Assistant Examiner*—Willis Little
*Attorney, Agent, or Firm*—J. R. Campbell; Z. L. Dermer

[57] ABSTRACT

Apparatus for determining pellet length and end squareness which includes a base supporting a pair of linear variable differential transformers (LVDT) between which a pellet is placed for measuring end squareness. The LVDT's are perpendicularity detectors and each includes appropriate windings contained in a housing and an armature axially slidable therein. The armature is mounted on a shaft having extensions on opposite ends thereof. A swivel plate is attached to one end, while the other end is supported in a framework for the inspection apparatus, the arrangement being such that the housing containing the windings moves axially relative to the stationary armature. When a pellet is placed in position, each detector is advanced toward the pellet until its swivel plate contacts the pellet ends. If the pellet ends are not square, the swivel plates cock at an angle, thereby displacing the windings with respect to the armature. The relative displacement will be proportional to the tangent of the angle between the pellet ends and a plane perpendicular to the pellet axis. The pellet length is measured by a second LVDT which includes windings in a stationary housing. The armature moves relative to the windings and measures the relative distance between the swivel plates so that as the perpendicularity detectors sense the end squareness, the third LVDT senses pellet length along its axis. The output from the LVDTs is supplied to conventional readout circuitry and an indicating device which shows pellet length and end squareness.

15 Claims, 6 Drawing Figures

PELLET LENGTH AND END SQUARENESS INSPECTION APPARATUS

BACKGROUND OF THE INVENTION

1. Field of the Invention

The invention described herein relates to pellet inspection apparatus, and more particularly, to equipment designed to automatically inspect nuclear fuel pellets to determine whether the pellets meet length and end squareness standards.

2. Description of the Prior Art

Nuclear fuel pellets used in many nuclear reactors are made of enriched uranium dioxide and are right circular cylinders measuring about 0.366 inch diameter by 0.600 inch length. During the manufacturing operation, after pellets are fired, ground and inspected for flaws on their outer surface in the manner disclosed in copending application Ser. No. 646,789, filed Jan. 6, 1976 and entitled "Automatic Inspection And Sorting System For Chipped Nuclear Fuel Pellets", they are transferred to a second inspection area where length and squareness measurements are taken. Criteria have been established which require that each pellet end must be held to a high degree of squareness, e.g., 0.004 in. with the pellet axis to help assure loading of the pellets in fuel tubes without jamming. This production operation is carried out by locating the pellet in a V-block with its axis vertical to a surface plate and positioning a dial indicator on the top surface of the pellet. As the pellet is rotated in the V-block relative to the dial indicator, the degree of nonsquareness is observed and the pellet discarded in the event it exceeds predetermined limits. The major disadvantages of this measuring technique are that it is slow and involves very tedious work, pellet chips on the top surface interfere with the measurements, the inspector must observe both the high and low readings and then calculate the difference therebetween to determine pellet acceptance.

The pellet length is measured to determine pellet volume and density and is accomplished by positioning the pellet in a conventional micrometer which provides a direct reading of the pellet length. Since planes passing through the ends of the pellets are rarely parallel, the length measurement attained is usually longer than the mean pellet length along the axis, upon which volume calculations are based. With a 0.004 in. nonsquareness tolerance on each end, the error contribution can range from 0 to about −0.67% absolute density.

Further, the manual methods used in determining length and end squareness of uranium dioxide pellets cannot reasonably be used with plutonium enriched pellets because of the extreme health hazards which result from their radioactivity and toxicity characteristics.

BRIEF SUMMARY OF THE INVENTION

Briefly stated, the above disadvantages are eliminated in accordance with this invention by providing an electro-mechanical system which utilizes perpendicularity detectors to measure pellet end squareness. These detectors, such as linear variable differential transformers which utilize linear displacement measuring means are positioned on opposite sides of a pellet and displaceable members on the ends of each detector are arranged to simultaneously contact opposite ends of the pellet being inspected. Displacement of either or both members causes a change in the LVDT magnetic field linking the LVDT armature, thus providing an output voltage at each LVDT proportional to the tangent of the angle between a plane passing through the pellet axis and the actual respective end surface of the pellet. Pellet length is accurately determined by utilizing a third LVDT detector which measures the distance between the members used for detecting pellet end squareness.

An object of the invention therefore is to provide apparatus which measures pellet end squareness to determine whether they fall within prescribed tolerances.

Another object of the invention is the provision of apparatus for measuring pellet ends for squareness while simultaneously measuring pellet length to determine whether the dimensions taken fall within prescribed tolerances.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawing wherein:

DESCRIPTION OF THE PREFERRED EMBODIMENT

Figure 1:
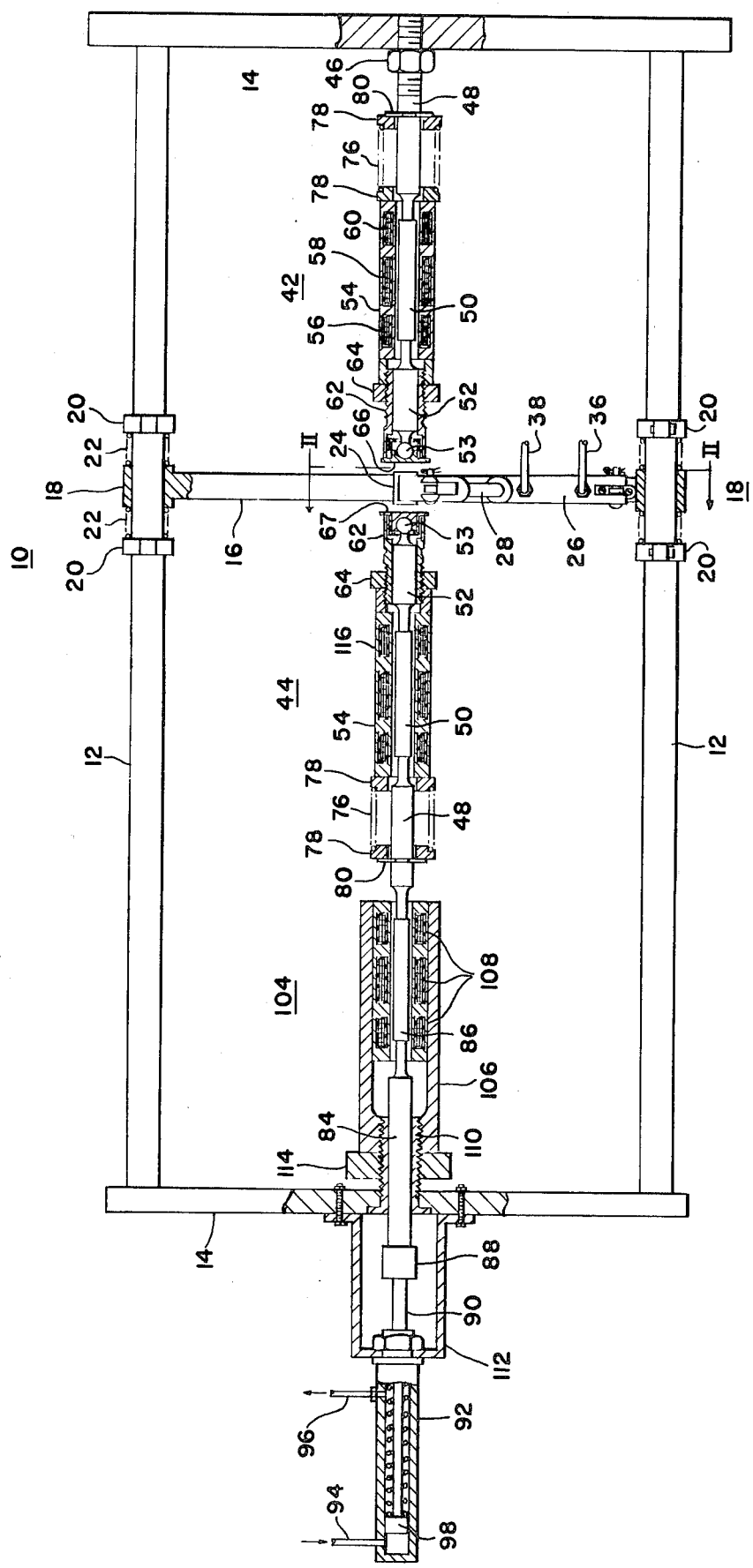
FIG. 1 is a plan view of pellet test apparatus which measures fuel pellets for length and end squareness.

Referring now to the drawings wherein like reference characters designate like or corresponding parts throughout the several views, there is shown in FIG. 1 a plan view of the apparatus used for determining pellet length and end squareness. The apparatus consists of a framework 10 including bridging bars 12 and end supports 14, and a movable pellet holder support arm 16 which bridges the bars 12 as shown. The opposite ends of the pellet holder support arm terminate in housings 18 journalled to bars 12 and designed to move axially along the bar length. A pair of spaced stops 20 are secured to the bars 12 and springs 22 are interposed between these stops and the adjacent ends of bearing housing 18. The springs 22 allow the pellet holder support arm to be self-centering on bars 12 while springs 22 permit the support arm to move axially of the framework, thus providing flexibility in the system.

Figure 2:
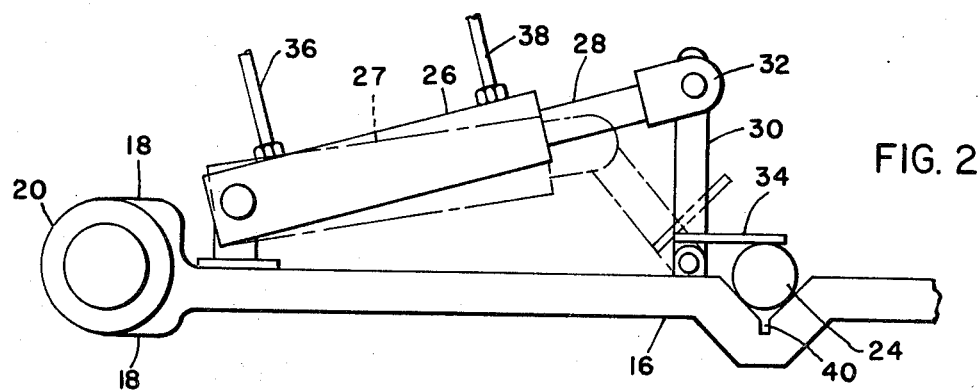
FIG. 2 is a view taken on line II—II of FIG. 1.

As illustrated in FIGS. 1 and 2, the pellet holder support arm 16 is designed to hold a pellet 24 which is to be inspected for length and end squareness. As more clearly shown in FIG. 2, the arrangement used for holding a pellet in position includes an air cylinder 26 having a piston 27 connected to connecting rod 28 axially slidable therein. A movable arm 30 connected at one end to a clevis 32 and at its other end to arm 16 includes a pellet support bracket 34 welded or otherwise attached to the arm 30. Air from an appropriate air source preferably controlled by a foot-actuated switch, not shown, is supplied through lines 36 and 38 to cause axial movement of piston 27 in the cylinder. As shown by the dash lines in FIG. 2, when the piston is retracted in cylinder 26, arm 34 assumes an open position. Upon insertion of a pellet in the V-shaped opening 40, air supplied through inlet line 36 causes movement of piston 27 to the right which actuates arm 34 toward a closed position and into contact with pellet 24, thereby securely holding it in position for test purposes. To remove the pellet, air supplied through inlet 38 moves piston 27 in the reverse direction, thus retracting arm 34 from its pellet holding position.

Two perpendicularity detectors 42, 44, preferably linear variable differential transformers, such as model 050 HR-DC manufactured by Schaevitz Engineering Co., Pennsauken, New Jersey, are respectively positioned on opposite sides of pellet 24, and are used for measuring squareness of the pellet ends. Each of the detectors are of the same design and construction and detector 42 includes a stationary shaft securely bolted or otherwise affixed to the end support 14 by nut 46. The shaft for detector 44 connects with a third linear variable differential transformer, more fully described hereafter. The shaft for each detector 42, 44 is divided into three sections, 48, 50 and 52, section 48 being secured to the wall as aforementioned, while the other end is threaded into a solid ferromagnetic armature 50. Section 52 likewise is threaded into armature 50 and terminates at its other end in a ball 53, thus providing an uninterrupted length of shaft held in a stationary position. Each armature 50 is surrounded by an axially movable housing 54 which contains windings 56, 58 and 60. The open end of housing 54 is threaded onto an externally threaded bushing 62 mounted coaxially with shaft section 52, and a lock ring 64 is used for holding the parts in a predetermined position. The purpose of the threaded connection between the housing 54 and coaxial bushing 62 is to provide for axial adjustment of the windings relative to the armature 50 to achieve a zero or null point in an output voltage of each linear variable differential transformer 42, 44.

Figure 3:
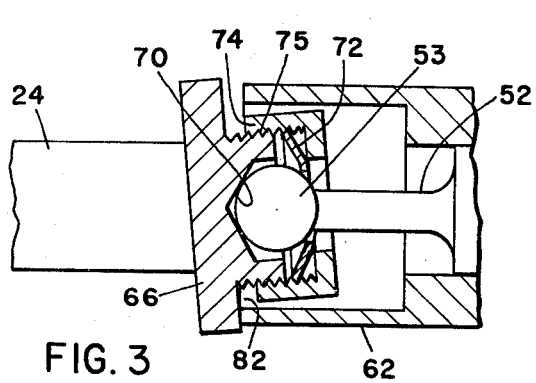
FIG. 3 is an enlarged view of a mechanism used for holding a swivel plate in position for tests to determine end squareness.

The duplicate swivel plates 66, 67, respectively, attached to the end of shaft sections 52 are arranged to contact opposite ends of pellet 24 for the purpose of determining the squareness of the pellet end contacted. The enlarged view of one swivel plate arrangement illustrated in FIG. 3 shows that the shaft section 52 terminates in a ball 53 integrally formed on the end thereof. The ball fits into a V-shaped or complementary opening 70 formed in the backside of the swivel plate 66, thus permitting the swivel plate to freely move relative to ball 53 on the end of the stationary shaft when it engages and conforms to an end of an unsquare pellet. The arrangement used for holding the parts together includes a disc-like spring member 72 which fits around and holds the end of ball 68 and is held in position by a cylindrical cap 74 which is threaded onto an extension 75 projecting rearwardly from swivel plate 66.

With the parts set in position as described above, the housing 54 and coaxial bushing 62 for each detector 42, 44 are urged toward the pellet by a spring 76 coaxially mounted on shaft section 48. The spring is held between a pair of stop members 78 and a retaining ring 80 serves as a backing member which loads spring 76 to a compression just sufficient to cause the end of bushing 62 to contact the back surface 82 of the swivel plate. The spring precludes looseness between parts in the system while still offering slight resistance to housing 54 axial movement.

As more fully described hereafter, as the surface of the swivel plates 66, 67 contact and conform to unsquare ends of the pellet 24, the inner surface 82 of each swivel plate urges the end of coaxial bushings 62 and housings 54 rearwardly. This action displaces differential transformer windings 56, 58 and 60 axially with respect to armature 50, thus disrupting the transformer balanced magnetic condition and providing an output voltage at its terminals.

The structure used for moving the swivel plates 66, 67 into contact with pellet 24 ends includes a shaft 84 connected through an armature 86 to shaft section 48 for the perpendicularity detector 44. A coupling 88 connects shaft 84 to a piston actuated connecting rod 90 in air cylinder 92. Conventional air inlet 94 and outlet 96 serve to pressurize and vent the air cylinder as the piston 98 is axially moved therein.

As a pellet is placed in position on the pellet holder support arm 16, actuation of the piston 98 causes shaft 84 to move in a direction to the right, thus forcing the swivel plate 67 against pellet 24. Since the support arm 16 is slidably mounted on the bridging bars 12, further movement of the shaft 84 causes the arm 16 to move to the right, thus placing the end of pellet 24 in contact with the swivel plate 66. With only slightly extra force, the swivel plates are caused to conform to the ends of the pellet, and in so doing, move the housings 54 in both detectors 42 and 44 in opposite directions and in an amount which corresponds to the amount of offset on the pellet ends.

Figure 6:
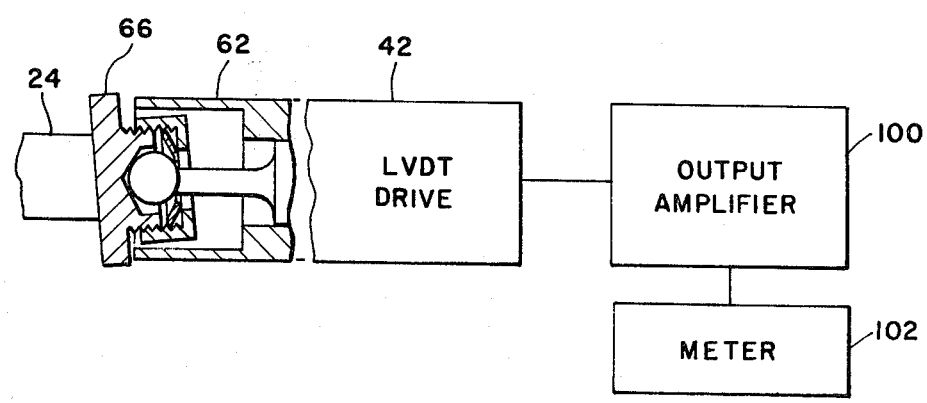
FIG. 6 is a general showing of components used for sensing pellet out-of-squareness dimensions and visually displaying the magnitude of variation from a normal pellet.

As this occurs, the transformer windings in housing 54 are physically displaced relative to armature 50. This displacement changes the transformer electrical output because the output voltage is based upon the magnetic coupling of a permeable core. The output voltage is therefore proportional to the tangent of the angle between the pellet end and a plane perpendicular to the pellet axis. The maximum allowable non-squareness tolerance on each pellet end is 0.004", and pellet ends which exceed this tolerance are removed from the system. The linear variable differential transformer drive and readout circuitry are well known in the art and, as generally shown in FIG. 6, transformer winding displacement takes place as a result of a swivel plate 66, 67 engaging a non-square pellet end face. The output voltage produced is amplified by amplifier 100 and supplied to a meter 102, such as a voltmeter, calibrated to digitally show out of squareness in inches, magnitude of offset angle, or the like. Since measurements are taken on both ends of each pellet, duplicate transformer drive and readout circuitry are used with each linear variable differential transformer.

After examination of the pellet ends for squareness has been completed, piston 98 is returned to its initial position thereby withdrawing swivel plate 67 from its pellet end contact position. This action permits the pellet holder support arm 16 to move to the left and out of contact with the face of swivel plate 66. Springs 76 in both detectors 42 and 44 act through housings 54 and bushings 62 to cause swivel plates 66, 67 to assume a vertical position in preparation for the next pellet examination.

In addition to detecting pellet end face out-of-squareness, the apparatus disclosed also is designed to measure pellet length. To accomplish this, a third LVDT 104 is mounted on end bracket 14 coaxially with differential windings 108, is supported on guide bearing 110 positioned in end bracket 14. As shown in FIG. 1, the guide bearing and a bracket 112 supports air cylinder 92, shaft 84 and its connected armatures and shaft sections which terminate in swivel plate 67. The housing containing transformer windings 108 is also adjustable axially with respect to armature 86 to obtain a null point or zero output voltage which corresponds to a standard length pellet. Adjustment is achieved by rotating the housing 106 on guide bearing 110 and both parts are threaded for this purpose. Lock ring 114 holds the parts in a preselected position after the adjustment process has been completed.

OPERATION

To measure pellet length simultaneously with determining end squareness, a test pellet of precise length and end squareness is clamped on the pellet holder support arm 16 by the structure shown in FIG. 2. Air admitted under pressure into air cylinder 92 moves piston 98 to the right, thus linearly advancing the shafts, armatures and swivel plate 67 into contact with the test pellet end face. Further shaft movement causes support arm 16 to slide forwardly on bridging bars 12 until the other end of the test pellet engages swivel plate 66. The housings 54 for both LVDT 42 and 44 are rotated on bushings 62 relative to their armatures to provide a null or zero output voltage, and lock rings 64 tightened to lock the parts in place. Thereafter, upon substitution of a pellet to be measured for the test pellet, any variation in end face squareness will be detected and registered on voltmeter 102. As aforementioned, the voltmeter is calibrated to read the amount of out-of-squareness in terms of the variation in angle from a normal pellet, in inches GO-NO-GO, or the like.

With a test pellet still in place, to establish a reference for pellet length, housing 106 for LVDT 104 is rotated on guide bearing 110 until a null point is reached, as indicated on the voltmeter used to show pellet length. It will be understood that a duplicate LVDT drive and readout circuitry of the type generally shown in FIG. 6 also it utilized to indicate pellet length. After the null point is reached, lock ring 114 locks the parts in position. Since the null point adjustment is made with a pellet of precise length, a zero reading on the voltmeter is thus representative of a pellet having such length. Upon the substitution of a pellet to be measured for the test pellet in the fixture, any variation in pellet length detected by LVDT 104 will visually show on the voltmeter which desirably is calibrated in inches.

Figure 4:
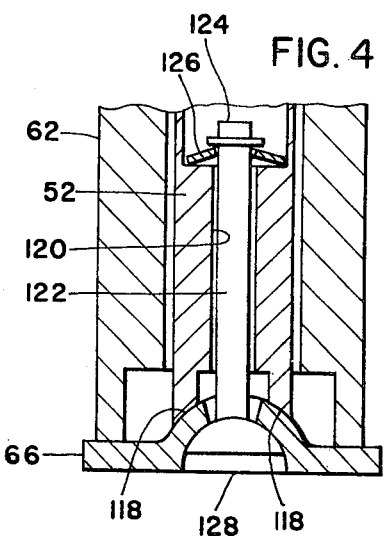
FIG. 4 is a view in elevation, partly in section, illustrating a modified arrangement for holding the swivel plate in position.

Analysis of the swivel plate arrangement shown in detail in FIG. 3 will show that the point where the front surface of the swivel plate is pierced by the shaft 52 axis will appear to translate, or move slightly away from the axis, when the swivel plate surface engages a pellet having a non-square end. This variation may introduce a small but negligible error in both the pellet angularity and length readings. A design which will eliminate such errors is illustrated in FIG. 4. The parts move in essentially the same manner as previously described inasmuch as swivel plate 66 will move and conform to an out-of-square pellet end face when placed in contact therewith. Such movement causes displacement of bushing 62 rearwardly as before and changes the electrical output of the LVDT. However, the reverse side 116 of the swivel plate is made to a spherical configuration which engages and rides in a seat 118 of complementary design formed on the end of shaft 52. The shaft has a hollow channel 120 through which rod 122 extends and terminates at one end in a hemisphere which rides on the spherical portion of the swivel plate. Cap 124 and spring washer 126 firmly anchors the rod in position. This construction provides a virtual pivot at point 128 so that as the swivel plate tilts when placed in contact with an unsquare pellet end, errors resulting from translation of the swivel plate will not be reflected in LVDT output.

Figure 5:
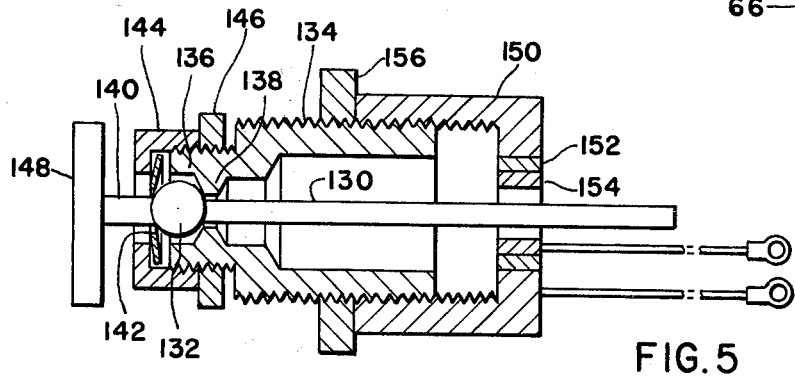
FIG. 5 is another modification illustrating the design of mechanism used for holding the swivel plate in position.

In lieu of using the LVDT arrangement disclosed in FIGS. 1-4 and 6, a more simplified but less precise design of the type shown in FIG. 5 may be used. A shaft 130 having a ball 132 near one end is mounted in an externally threaded cylinder 134. The cylinder includes a reduced diameter portion 136 and an inwardly directed section 138 which forms an opening sufficient to provide a loose fit with shaft 130. A spring washer 142 which encircles shaft extension 140 is loaded against ball 132 by an adjustable cap 144 threaded on to reduced section 136. Lock ring 146 secures the parts in position. As shown, swivel plate 148 is integrally formed with shaft extension 140 and ball 132. Adjustable cylindrical member 150 threaded on the cylinder 134 is provided with a central opening through which shaft 130 extends. An insulator 152 and copper contact ring 154 are fixed in the opening and electrical leads respectively connected to the copper ring and the member lead to electrical alarm contacts, a light or other indicating device.

It will be apparent that when swivel plate 148 engages an unsquare pellet end, the swivel plate and its connected shaft 130 will deflect and should the pellet end exceed a preestablished tolerance, shaft 130 will contact the copper ring to sound an alarm indicating non-acceptability of the pellet being measured. The device may be adjusted to accommodate pellet batches of different end angularity by threading the member 150 to different distances on cylinder 134. Lock ring 156 locks the parts together.

It will be apparent that many modifications and variations are possible in light of the above teachings. It therefore is to be understood that within the scope of the following claims, the invention may be practiced other than as specifically described.

I claim:

1. Apparatus for measuring the squareness of pellet end faces with respect to the pellet axis comprising:
   a frame mounted on a suitable base;
   a pellet holder on said frame having means for holding a pellet to be measured;
   a pair of perpendicularity detectors mounted on said frame in axial spaced relationship, and said pellet holder being located intermediate said detectors;
   each of said detectors having a movable end capable of conforming to the oppositely disposed end faces of said pellet;
   each of said movable ends including a swivel plate;
   means pivotally connecting each of said swivel plates to its detector for permitting said plates to pivot and conform to the ends of said pellet;
   actuating means in said detectors for effecting engagement of the detectors' swivel plates respectively with said pellet ends; and
   measuring means associated with each of said detectors for measuring the amount that each end face on the pellet is offset from the pellet axis.

2. The apparatus according to claim 1 wherein a third detector is mounted on said frame for measuring the length of each of said pellets; and means in said third detector coupled with at least one of said perpendicular detectors for sensing the pellet length.

3. Apparatus according to claim 1 wherein said pellet holder means comprises a clamp movable between open and closed positions; and the device connected with said clamp for immovably holding the pellet in alignment with said perpendicularity detectors.

4. Apparatus according to claim 1 wherein said pellet holder means comprises a pellet holder support arm which bridges spaced bars on said frame and is slidably mounted thereon;

means on said arm for accepting a pellet which is axially aligned with said detectors; and a power actuated clamping device on said arm selectively operable to hold said pellet in a fixed position to permit the taking of said end face measurements.

5. Apparatus according to claim 4 wherein a self-centering device is mounted on each of said bars and cooperatively associated with that portion of the support arm which slides on said bars, said self-centering devices being effective in maintaining perpendicular alignment between the support arm and said perpendicularity detectors.

6. Apparatus according to claim 1 wherein each of said perpendicularity detectors comprises a transducer having said movable end attached thereto;

displaceable means in each of said transducers selectively movable axially thereof when said movable ends engage and conform to the ends of a pellet having out-of-square end faces; and display means operatively coupled with said transducers for visually displaying the amount of out-of-squareness of each of said pellet end faces.

7. Apparatus according to claim 6 wherein each of said linear transducers comprises a linear variable differential transformer having a shaft mounted armature and a coaxial housing containing windings axially slidable with respect to said armature; and spring means adjacent one end of said housing for biasing said housing toward said movable end and the face of said pellet to be measured, and for maintaining the movable end thereon aligned perpendicularly with said armature except when the movable ends are in contact with the end faces of said pellet.

8. Apparatus according to claim 7 wherein said pellet holder means comprises a pellet holder support arm having a device thereon which holds the pellet in axial alignment with said shaft mounted armature;

means slidably mounting said support arm on bars on said frame, thereby permitting movement of said support arm on the bars in a direction along the pellet length; and wherein said actuating device includes a power source connected with said shaft mounted armature so that as said shaft is actuated in a linear direction toward the pellet, the movable end engages said pellet and its support arm and moves the same in a direction to cause the other face of said pellet to engage the oppositely disposed movable end on the other differential transformer.

9. Apparatus according to claim 8 wherein said housing and the transformer windings therein are adjustably mounted with respect to said armature so as to provide on said display means a zero reading when a test pellet is positioned on said support arm and between said differential transformers.

10. Apparatus according to claim 2 wherein said third detector comprises a linear variable differential transformer mounted in axial alignment with said perpendicularity transformers;

said third differential transformer comprising an armature connected to the shaft mounted armature for one of said other differential transformers and having a housing including transformer windings therein disposed radially from said armature;

means mounting said housing and its contained windings on said frame; and display means electrically coupled to said third differential transformer windings which displays a zero reading when a test pellet is positioned between and in contact with the movable ends on each of said perpendicularity transformers, whereby as said armature in the pellet length detector is displaced from its windings when the perpendicularity detectors engage the end faces of a pellet being measured, said display means will indicate the amount of such displacement in terms of pellet length.

11. Apparatus according to 10 wherein said actuating means comprises an air cylinder having a piston axially slidable therein;

a shaft connected at one end to said piston and at its other end to a shaft connected to said pellet length detector armature so that upon actuation of the piston in said air cylinder, the armature for each of the said pellet length detector and one of the perpendicularlity detectors moves to have its movable end contact an end face of said pellet and thus move the other end face into contact with the movable end for the other perpendicularity detector to thereby obtain out-of-squareness readings of said pellet end faces while simultaneously obtaining a visual indication of the pellet length.

12. Apparatus according to claim 1, wherein the movable end on each of said perpendicularity detectors includes a shaft having a ball on one end thereof and connected at its other end to the armature;

each of said swivel plates being connected to the end of said ball and being arranged to freely rotate thereon and thereby conform to the end of an out-of-square pellet face; and each of said swivel plates further having a flange thereon which engages the end of said housing and acts to displace said housing axially when the swivel plates conforms to an out-of-square pellet face.

13. Apparatus according to claim 1, wherein the movable end on each of said perpendicularity detectors includes a shaft connected at one end to said armature and having an axially disposed channel in its other end;

a rod in said channel secured at one end to said shaft and terminating at its other end in hemispherical portions formed on said swivel plate, thereby permitting said swivel plate to move relative to said rod as the swivel plate face conforms to the end face of a pellet being measured; and complementary surfaces on said shaft and said hemispherical portion on the swivel plate which cause the swivel plate to move about a virtual pivot lying in the plane of the pellet end surface and on the nominal pellet axis.

14. A pellet end squareness checking probe comprising:
   a housing in the form of a cylinder having an opening on one end and an opening of lesser diameter on the other end thereof;
   a shaft extending through said openings and having a ball on one end thereof positioned outside said housing;
   a swivel plate integrally formed with said ball and its connected shaft;
   a cap extending over said ball and adjustably mounted on said housing, and biasing means between said ball and said cap for precluding axial movement of said ball and its connected shaft out of said housing;
   an electrical contact ring insulated from but secured to the end of said housing opposite said ball, said ring being spaced from said shaft which extends therethrough; and
   electrical contacts respectively connected to said ring and said housing and being adapted for connection to an electrical alarm;
   whereby as said swivel plate engages an out-of-square pellet end face, said shaft which is connected thereto through the ball, pivots and engages said copper ring to thereby indicate that the end face of a pellet being measured includes an end face angle greater than that for an acceptable pellet.

15. Apparatus according to claim 14, wherein said copper ring is mounted in a measuring member which is adjustably mounted on said housing, the arrangement being such as the measuring member is advanced on said housing, the permitted angularity of a pellet end face will be increased before contact is made between said shaft and the electrical contact ring.

* * * * *